Patented Dec. 8, 1953

2,662,080

UNITED STATES PATENT OFFICE 2,662,080

METHOD FOR PRODUCING DERIVATIVES OF HEXAHYDROPYRIMIDINE AND CONVERTING THE SAME TO 1,3-DIAMINES

Curtis W. Smith, Berkeley, Calif., assignor to Shell Development Company, Emeryville, Calif., a corporation of Delaware No Drawing. Application January 4, 1952, Serial No. 265,058

12 Claims. (Cl. 260—251)

This invention relates to a method for producing nitrogen-containing compounds, including various derivatives of hexahydropyrimidine, and to a method for decomposing said compounds to 1,3-diamines.

It is known that when an alpha,beta-unsaturated carbonylic compound (e. g., acrolein) is reacted with an excess of a urea-type compound in the presence of nitric acid or other suitable catalyst, the urea compound reacts with the ethylenic as well as the carbonylic bond of the carbonylic reactant. In such reactions one of the principal products comprises a heterocyclic compound of the type having the general formula

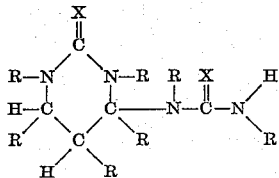

wherein the R's, which may be the same or different, represent hydrogen atoms or organic radicals (preferably hydrocarbon radicals such as alkyl, aryl, alkaryl or aralkyl radicals) and the X's represent oxo, thio, or imino radicals. In addition, linear products, including those of the type having the general formula $$\text{RHN.CX.NR.(CHR.CHR.}\overset{\text{NR.CX.NHR}}{\underset{|}{\text{CR.NR.CX.NR}})_y\text{H}}$$

wherein the R's and X's are as indicated above, and $y$ is a small whole number of from 1 to about 5, are also produced.

The foregoing reaction has been described as one between a urea-type compound and an alpha, beta-unsaturated carbonylic reactant. The term "urea-type" compound is employed herein to designate compounds of the type having the general formula RHN.CX.NHR, wherein X represents either =O, =S or =NH, and the R's, which may be the same or different, represent hydrogen atoms or organic radicals. Representative reactants of this type include urea, thiourea, guanidine, N - methylurea, N,N' - dimethylthiourea, N - phenylguanidine, N-methyl-N'-phenylurea, N-benzylurea, N-tolylurea, N-methyl-N'-ethylthiourea, N,N'-diethylguanidine, and the like. The carbonylic reactant is one of the type having the general formula

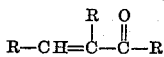

wherein the R's, which may be the same or different, represent hydrogen atoms or organic radicals, representative compounds being acrolein, crotonaldehyde, methacrolein, methyl vinyl ketone, beta-phenylacrolein, vinyl benzyl ketone, alpha-phenylacrolein, or the like. This reaction proceeds at ambient conditions of temperature and pressure, preferably in aqueous solution, and in the presence of nitric or other acid catalyst. There is employed at least 1.5 moles of the urea-type reactant for each mole of the carbonylic reactant, and preferably about 2 moles of the urea compound are used per each mole of the carbonylic reactant. As the urea-carbonylic molar ratio becomes appreciably greater than about 3:1, the reaction becomes less efficient in the sense that a portion of the urea-type compound is not converted to the desired product compounds.

It has now been discovered that when one or more of the products obtained by reacting a urea-type compound with an alpha,beta-unsaturated carbonylic compound, as described above, is hydrogenated at elevated temperatures in the presence of a hydrogenation catalyst, at least one mole of the original urea-type reactant splits out for each mole of material hydrogenated, thereby forming valuable product compounds. In the case of the heterocyclic materials, the reaction obtained by hydrogenation can be represented by the following general equation:

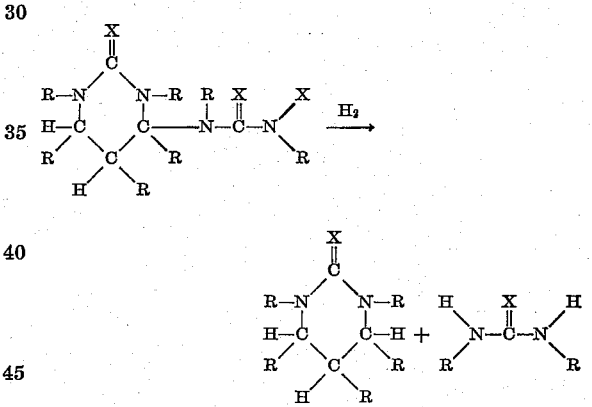

wherein the R's, which may be the same or different, represent hydrogen atoms or organic radicals, preferably hydrocarbon radicals such as alkyl, aryl, alkaryl or aralkyl radicals, and wherein the X's represent oxo, thio or imino radicals. In the case of the linear starting materials, the reaction obtained by hydrogenation can be represented by the following general equation

wherein the R's and X's are as indicated above, and y is a small whole number between 1 and 5.

Specific reactions which are illustrative of those which occur during hydrogenation are as follows: The formation of tetrahydro-2-pyrimidone (2-oxo-hexahydropyrimidine) by hydrogenation of 4-ureidotetrahydro-2-pyrimidone (obtained by reacting 1 mole of acrolein with 2 moles of urea); the formation of tetrahydro-2-thiopyrimidone (2-thiohexahydropyrimidine) by hydrogenation of 4-thioureidotetrahydro-2-thiopyrimidine (obtained by reacting 1 mole of acrolein with 2 moles of thiourea); the formation of 2-iminohexahydropyrimidine by hydrogenation of 4-guanido-2-iminohexahydropyrimidine (obtained by reacting 1 mole of acrolein with 2 moles of guanidine); the formation of 6-methyltetrahydro-2-pyrimidone by hydrogenation of 6-methyl-4-ureidotetrahydro-2-pyrimidone (obtained by reacting 1 mole of crotonaldehyde with 2 moles of urea); the formation of 5-methyltetrahydro-2-pyrimidone by hydrogenation of 5-methyl-4-ureidotetrahydro-2-pyrimidone (obtained by reacting 1 mole of methacrolein with 2 moles of urea); and the formation of 4-methyltetrahydro-2-pyrimidone by hydrogenation of 4-methyl-4-ureidotetrahydro-2-pyrimidone (obtained by reacting 1 mole of methyl vinyl ketone with 2 moles of urea).

A specific reaction which is illustrative of those which occur during hydrogenation of linear products is as follows, the material undergoing hydrogenation here being the product obtained by reacting 1 mole of acrolein with 2 moles of urea.

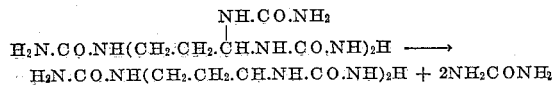

In conducting the hydrogenation reaction of the present invention, a solution of the material to be hydrogenated is treated with hydrogen in the presence of a hydrogenation catalyst at temperatures above about 75° C., the reaction being conducted in either atmospheric or superatmospheric pressures. The hydrogenation step can be terminated whenever desired, though in the interest of efficiency of operation, the hydrogenation is continued until at least 1 mole of hydrogen has been absorbed for each mole of reactant compound. As hydrogenation catalyst there can be employed any material which is active as a hydrogenation-dehydrogenation catalyst. Suitable materials of this type include finely divided nickel or nickel deposited on kieselguhr or pumice, colloidal platinum, finely divided palladium, metallic chromium, alumina, iron oxide-chromium oxide, copper oxide-chromium oxide compositions, and the like. The catalyst can be used in any suitable amount, the amount used being dependent upon the nature of the reactant, the character of the reactant substance, the operating conditions of the reaction, etc. In general, however, an amount of catalyst ranging from between about 0.5% and about 10%, based on the weight of reactants, gives satisfactory results.

It has also been found that when one or more of the various heterocyclic and linear products obtained by a practice of the above-described hydrogenation step are subjected to hydrolysis in the presence of an acid or a base, these products are decomposed to 1,3-diamines. In the case of the heterocyclic products, the reaction which takes place during hydrolysis can be represented by the following general equation:

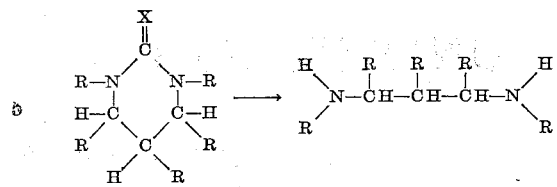

wherein the R's and the X's are as indicated above. In addition, there is also formed carbon dioxide, ammonia, carbon disulfide, or the like, depending upon whether the X is an oxo, thio, or imino group.

In the case of the linear reaction products, the reaction which occurs during hydrolysis can be represented by the following general equation:

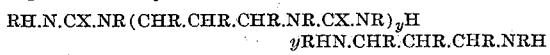

wherein the R's and X's are as indicated above and y represents a small whole number between about 1 and 5. As was the case with the products obtained on hydrolyzing the heterocyclic starting materials, here again there will also be formed ammonia, together with carbon dioxide, and the like, depending on the nature of the group represented by X.

The hydrolysis reaction of the present invention is illustrated by a number of specific reactions; thus, hydrolysis of tetrahydro-2-pyrimidone yields 1,3-diaminopropane, and in a similar 1,3-diaminopropane is also obtained by hydrolysis of either tetrahydro-2-thiopyrimidone or 2-iminohexahydropyrimidine. Again, hydrolysis of 6-methyltetrahydro-2-pyrimidone yields 1,3-diaminobutane, while 1,3-diamino-2-methylpropane is formed by hydrolysis of 5-methyltetrahydro-2-pyrimidone or the corresponding 2-thio or 2-imino-substituted starting materials.

As regards hydrolysis of linear reaction products, a specific reaction is that wherein 1,3-diaminopropane is obtained by hydrolyzing the product obtained on hydrogenating the reaction product of 1 mole of acrolein with 2 moles of urea.

The conditions employed in the hydrolysis step of the present invention are those which are conventionally employed in other hydrolysis operations of this same general character. Thus, after addition of the acid or base material to an aqueous solution of the material undergoing hydrolysis, the solution is heated at atmospheric or superatmospheric pressures for the desired interval of time. The diamine reaction products can be recovered from the raction mixture by any one of several available procedures. In one recovery method the amines are steam distilled from the reaction mixture and are then recovered from the distillate by saturating the latter with alkali followed by extraction with ether. Another separation method is to form acid salts of the amine present in the reaction mixture and then to strip off the water from the latter. The remaining amine salts can then readily be converted into the amine condition.

It has been brought out in the preceding portions of this application that in either or both of the hydrogenation and hydrolysis steps, there may be treated either single starting compounds or mixtures thereof. It should also be pointed out that good results are obtained by working with the reaction mixtures as a whole. That is to say, the reaction mixture obtained by reacting a urea-type compound with an alpha,beta-unsaturated carbonylic reactant can be hydrogenated in the presence of a hydrogenation catalyst and, if desired, the resulting reaction mixture can then be hydrolyzed, preferably after being separated from the hydrogenation catalyst.

The process of the present invention is more specifically illustrated by the following examples.

*Example I*

In this operation a solution was prepared containing 6 moles of urea, 9 grams of concentrated nitric acid and 360 grams of water. To this solution there was slowly added 2 moles of acrolein, the temperature of the reaction mixture being maintained at about 65° C. by cooling. The reaction mixture so obtained was then neutralized with sodium hydroxide. To the solution was added a quantity of about 10 grams of Raney nickel, following which the solution was hydrogenated at 125° C. to 155° C. and 1000 to 1500 p. s. i. g. until one mole of hydrogen was absorbed per mole of acrolein charged. Two-thirds of the resulting mixture was then separated for further working up. After removal of the catalyst by filtration, the filtrate was evaporated to drive off ammonia (formed on hydrolysis of urea) and water. The residue was suspended in ethanol, and 68 grams of crystals were separated from the ethanol solution. Concentration of the mother liquor yielded an additional crop (25 grams) of crystals. The total crude crystal crop so obtained was then recrystallized, once from ethanol and once from water, there being recovered 35 grams of pure crystalline tetrahydro-2-pyrimidone having a melting point of 259–260° C., which corresponds with the known melting point of tetrahydro-2-pyrimidone. A small sample of the crystals, on being sublimed under vacuum, was found to have an elemental composition corresponding to that expected from this compound.

The mother liquor obtained after separating out the crystals as described above was a viscous, brown, water-soluble syrup which was found to contain 36.87% carbon, 7.75% hydrogen and 29% nitrogen. From material balance and analysis of the syrup, it was concluded that the product was derived from urea and acrolein in the average molar ratio of 4:3, and that the composition was essentially made up of alternating trimethylene and urea units having the structure

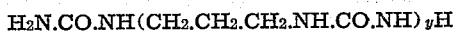

with $y$ having an average value of about 3.

*Example II*

A 208 gram portion (69%) of the reaction mixture obtained from the drop-wise addition of 1 mole of acrolein to a solution containing 2 moles of urea and 6 grams of concentrated nitric acid in 120 grams of water, was neutralized with sodium hydroxide and hydrogenated in the presence of 3 grams of Raney nickel at 150° C. and at 1000–1500 p. s. i. g. The catalyst was removed from the solution by filtration, and to the resulting filtrate was then added 80 grams of sodium hydroxide. The solution was then distilled at atmospheric pressure to hydrolyze the urea derivatives. After the solids started separating out, steam was passed through the mixture to aid the distillation. The distillates were combined, acidified and evaporated to dryness. The amine was liberated with 40% sodium hydroxide, extracted with ether, dried over solid sodium hydroxide and distilled, yielding 18.3 grams of 1,3-propanediamine boiling at 136–138° C. Extraction of the steam distillation residue with ethanol, followed by distillation of the extract, yielded another 8.1 grams of 1,3-propanediamine. Based on the amount of acrolein employed, the yield of diamine was 52%.

The products formed by the hydrogenation step of the present invention, as well as the 1,3-diamines formed on the hydrolysis of such products, are valuable compounds which are useful for a number of purposes in addition to their utility as intermediates.

The invention claimed is:

1. The process of forming a compound of the type having the general formula

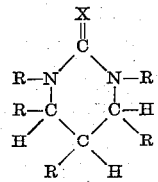

said process comprising reacting with molecular hydrogen a compound having the general formula

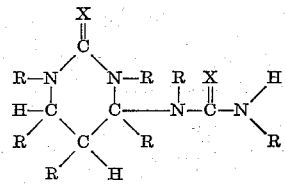

under hydrogenating conditions at a temperature above 75° C. but below that at which substantial pyrolysis occurs in the presence of a hydrogenation catalyst, the R's in said general formulae representing a member selected from the group consisting of the hydrogen atom and hydrocarbon radicals having one to seven carbon atoms and the X's representing a member selected from the group consisting of oxo, thio and imino radicals.

2. The process of forming a tetrahydro-2-pyrimidone comprising reacting with molecular hydrogen 4-ureidotetrahydro-2-pyrimidone under hydrogenating conditions at a temperature above about 75° C. but below that at which substantial pyrolysis occurs in the presence of a hydrogenation catalyst.

3. The process of forming tetrahydro-2-thiopyrimidone comprising reacting with molecular hydrogen 4-thioureidotetrahydro-2-thiopyrimidone under hydrogenating conditions at a temperature above 75° C. but below that at which substantial pyrolysis occurs in the presence of a hydrogenation catalyst.

4. The process of forming 2-iminohexahydropyrimidine comprising reacting with molecular hydrogen 4-guanido-2-iminohexahydropyrimidine under hydrogenating conditions at a temperature above 75° C. but below that at which substantial pyrolysis occurs in the presence of a hydrogenation catalyst.

5. In a method for producing a 1,3-diamine from at least one compound selected from the group consisting of compounds of the general structure

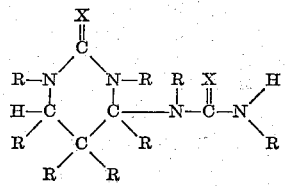

and compounds of the general structure

NR.CX.NHR
|
RHN.CX.NR.(CHR.CHR.CR.NR.CX.NR)$_y$H in which each R represents a radical selected from the group consisting of the hydrogen atom and hydrocarbon radicals having one to seven carbon atoms, each X represents a member of the group consisting of oxo, thio and imino radicals, and y is a small integer from 1 to 5, the steps comprising reacting molecular hydrogen with at least one of said compounds under hydrogenating conditions at a temperature above 75° C. but below that at which substantial pyrolysis occurs in the presence of a hydrogenation catalyst, and subjecting the product of said reaction step which is a member of the group consisting of compounds of the general structure

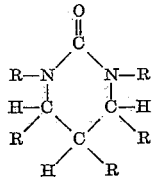

and compounds of the general structure

RHN.CX.NR.(CHR.CHR.CHR.NR.CX.NR)$_y$H to hydrolysis in the presence of a material selected from the group consisting of acids and bases.

6. The method of claim 5 wherein the compound hydrogenated is produced by reacting in the presence of a mineral acid an alpha,beta-unsaturated carbonylic compound of the general structure

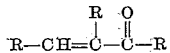

with a molar excess of a urea-type compound of the general structure

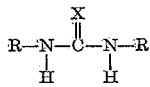

wherein the symbols R and X have the same significance as in claim 5.

7. The process wherein a compound of the general formula

NR.CX.NHR
|
RHN.CX.NR.(CHR.CHR.CR.NR.CX.NR)$_y$H in which each R represents a radical selected from the group consisting of the hydrogen atom and hydrocarbon radicals having one to seven carbon atoms, each X represents a member of the group consisting of oxo, thio and imino radicals, and y is a small integer from 1 to 5, is reacted with molecular hydrogen under hydrogenating conditions at a temperature above 75° C. but below that at which substantial pyrolysis occurs in the presence of a hydrogenation catalyst, thereby forming a compound of the general structure RHN.CX.NR.(CHR.CHR.CHR.NR.CX.NR)$_y$H +
yNHR.CX.NHR 8. In a method for producing 1,3-propanediamines, the steps comprising reacting acrolein with a molar excess of a urea-type compound of the general structure

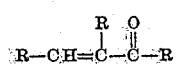

wherein each R represents a radical selected from the group consisting of the hydrogen atom and hydrocarbon radicals having 1 to about 10 carbon atoms, and X represents a member of the group consisting of oxo, thio, and imino radicals, in the presence of a mineral acid, reacting the compound of the general structure

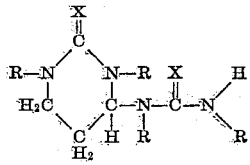

produced thereby with molecular hydrogen under hydrogenating conditions at a temperature above 75° C. but below that at which substantial pyrolysis occurs in the presence of a hydrogenation catalyst, subjecting the product having the general structure

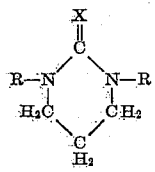

to hydrolysis in the presence of a member of the group consisting of acids and bases, and separating the 1,3-propanediamine from the hydrolyzed reaction mixture.

9. The process of claim 8 in which the urea-type compound is urea.

10. The process of claim 8 wherein the mineral acid used in the reaction of acrolein with said urea-type compound is nitric acid.

11. In a method for producing 1,3-propanediamines, the steps comprising reacting acrolein with a molar excess of a urea-type compound of the general structure

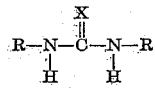

wherein each R represents a radical selected from the group consisting of the hydrogen atom and hydrocarbon radicals having 1 to about 10 carbon atoms, and X represents a member of the group consisting of oxo, thio, and imino radicals, in the presence of a mineral acid, reacting the compound of the general structure NR.CX.NHR
|
RHN.CX.NR.(CH$_2$.CH$_2$.CH.NR.CX.NR)$_y$H produced thereby with molecular hydrogen under hydrogenating conditions at a temperature above 75° but below that at which substantial pyrolysis occurs in the presence of a hydrogenation catalyst, subjecting the product having the general structure RHN.CX.NR.(CH$_2$.CH$_2$.CH$_2$.NR.CX.NR)$_y$H to hydrolysis in the presence of a member of the group consisting of acids and bases, and separating the 1,3-propanediamine produced from the hydrolyzed reaction mixture.

12. In a method for producing 1,3-diamines, the steps comprising reacting an alpha,beta-unsaturated carbonylic compound of the general structure

wherein each R represents a radical selected from the group consisting of the hydrogen atom and hydrocarbon radicals having 1 to about 10 carbon atoms, with a molar excess of urea in the presence of nitric acid, reacting the compound of the general structure

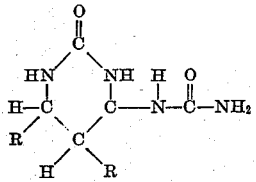

thereby produced with molecular hydrogen under hydrogenating conditions in the presence of a hydrogenation catalyst at a temperature above 75° C. but below that at which substantial pyrolysis occurs, subjecting the product having the general structure

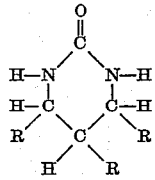

to hydrolysis in the presence of a member of the group consisting of acids and bases and separating the resulting 1,3-diamine from the hydrolyzed reaction mixture.

CURTIS W. SMITH.

References Cited in the file of this patent

UNITED STATES PATENTS

| Number | Name | Date |
|---|---|---|
| 2,374,485 | Haury | Apr. 24, 1945 |
| 2,486,648 | Haury | Nov. 1, 1949 |

OTHER REFERENCES

Bergmann et al., "J. Org. Chem.," vol. 13, pp. 353–356 (1948).